US007673790B2

(12) United States Patent
Haas et al.

(10) Patent No.: US 7,673,790 B2
(45) Date of Patent: Mar. 9, 2010

(54) VOTE BY MAIL ENVELOPE THAT PROTECTS INTEGRITY OF BALLOT DURING SIGNATURE VERIFICATION

(75) Inventors: Bertrand Haas, New Haven, CT (US); Matthew J. Campagna, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 162 days.

(21) Appl. No.: 11/821,662

(22) Filed: Jun. 25, 2007

(65) Prior Publication Data

US 2008/0314997 A1 Dec. 25, 2008

(51) Int. Cl.
*G06F 7/00* (2006.01)

(52) U.S. Cl. ........................................ 235/376; 705/12

(58) Field of Classification Search ................. 235/386, 235/376, 454, 50 A, 50 R, 85; 229/80, 71; 283/116, 167, 67

See application file for complete search history.

(56) References Cited

U.S. PATENT DOCUMENTS 4,211,434 A * 7/1980 Reese .......................... 229/69
4,834,552 A * 5/1989 Makowka ...................... 383/5
4,889,278 A * 12/1989 Steidinger .................. 229/92.1
5,523,746 A * 6/1996 Gallagher .................. 340/5.61
5,626,370 A * 5/1997 Petkovsek ................... 283/116
5,788,377 A * 8/1998 Vetter ............................ 383/5
5,818,031 A * 10/1998 Endoh ........................ 235/494
6,103,355 A 8/2000 Mehta
6,143,120 A 11/2000 Mehta et al.
6,692,819 B1 2/2004 Castle et al.
7,054,829 B2 * 5/2006 Campo et al. ................. 705/12
2005/0006470 A1 * 1/2005 Mrozik et al. ............... 235/385
2005/0061866 A1 * 3/2005 Ackley et al. ............... 229/306
2006/0089921 A1 * 4/2006 Witmond et al. ............ 705/401
2006/0120532 A1 * 6/2006 Kean et al. .................. 380/277
2006/0271236 A1 * 11/2006 Rosen et al. ................ 700/221
2007/0095908 A1 * 5/2007 Haas et al. .................. 235/386
2008/0136162 A1 6/2008 Haas et al.
2008/0156862 A1 7/2008 Haas et al.

* cited by examiner

*Primary Examiner*—Michael G Lee
*Assistant Examiner*—Tabitha Chedekel
(74) *Attorney, Agent, or Firm*—Brian A. Lemm; Angelo N. Chaclas

(57) ABSTRACT

A vote-by-mail return envelope that includes a pouch portion for containing the ballot and a stub portion on which the voter applies his/her signature and method for processing are provided. Each portion of the envelope contains a respective barcode that identifies the respective portion. When the envelope is received at the vote-counting location, the stub is separated from the pouch, thereby separating the voter's signature, name, etc. from the ballot. The signature is then verified from the stub, and subsequent processing of the pouch uses the pouch barcode identifier as a link to the stub barcode identifier and/or to the result of the signature verification, to determine whether the ballot in the pouch is eligible for counting or whether some remedial procedure is necessary.

8 Claims, 7 Drawing Sheets

VOTE BY MAIL ENVELOPE THAT PROTECTS INTEGRITY OF BALLOT DURING SIGNATURE VERIFICATION

FIELD OF THE INVENTION

The invention disclosed herein relates generally to vote by mail systems, and more particularly to an envelope that protects the integrity of ballots sent through the mail during the signature verification process.

BACKGROUND

In democratic countries, governmental officials are chosen by the citizens in an election. Conducting an election and voting for candidates for public office in the United States can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he must go to the polling place at which he is registered, based on the voter's residence. Another method for conducting an election and voting utilizes paper ballots that are mailed to the voter who marks the ballot and returns the ballot through the mail. Mailed ballots have been historically reserved for absentee voting. In the usual absentee voting process, the voter marks the ballot to cast his/her vote and then inserts the ballot in a return envelope which is typically pre-addressed to the voter registrar office in the corresponding county, town or locality in which the voter is registered. The voter typically appends his/her signature on the back of the envelope adjacent his/her human or machine readable identification.

When the return envelope is received at the registrar's office, a voting official compares the voter signature on the envelope with the voter signature retrieved from the registration file to make a determination as to whether or not the identification information and signature are authentic and valid, and therefore the vote included in the envelope should be counted. If the identification and signature are deemed to be authentic and valid, the identifying information and signature are separated from the sealed ballot before it is handed to the ballot counter for tabulation. In this manner, the privacy of the voter's selections is maintained and thus the ballot remains a "secret ballot".

One general problem with vote by mail envelopes is the signature is in the open and exposed for all to see throughout the process for determining whether or not the vote is authentic. This leads to potential privacy issues and concerns, e.g., fraudulent usage of a voter's signature. Some jurisdictions have required that such signatures be hidden from plain sight while the envelope is en route from the voter to the registrar's office. This will protect against easy imaging of the signature, such as, for example, with a hand scanner or digital camera, for later impersonation or other fraudulent purposes, e.g., identity theft. To comply with such requirements, envelopes have been proposed that hide the signature with a flap which is removed when the envelope is received at the registrar's office. These solutions, however, require some mechanical manipulation of the envelopes, which is both expensive and increases the risk of accidental tears of the envelope, potentially leading to damage to the ballots contained in the envelopes, exposing the marked ballot before the conclusion of the authentication process (which in some states require the ballot to be counted, regardless of the outcome of the authentication process), or the ability to link the voter with his/her ballot, thereby removing the secrecy of the ballot.

Voting by mail is becoming more prevalent, apart from the usual absentee voting, and in some jurisdictions, entire elections are being conducted exclusively by mail. As the voting by mail becomes more prevalent, the privacy concerns are also more prevalent. Thus, there exists a need for efficient methods and systems that can protect the privacy of signatures on ballots sent through the mail while also reducing the risk of damage to the ballots when the signatures are revealed.

SUMMARY

According to an aspect of the invention, a method of processing a vote-by-mail return envelope that includes a pouch portion for containing the ballot and a stub portion on which the voter applies his/her signature is provided. Each portion contains a respective barcode that identifies the respective portion or is provided with a respective barcode to identify the respective portion. The barcode on each portion may be identical, thus linking the two portions together, or alternatively the two barcodes on each envelope may be different and associated with each by some predetermined relationship, e.g., in a database, by a key, or the like, thereby linking the two portions together. The stub is then separated from the pouch, thereby separating the voter's signature, name, etc. from the ballot. The signature can then verified from the stub to determine whether the ballot in the pouch is eligible for counting or whether some remedial procedure is necessary. Since the signature stub has been removed from the pouch containing the ballot, the signature verification procedure can be performed using any suitable method, without requiring any special care to protect the ballot. The ballot contained in the pouch linked to the verified signature stub can then be identified based on the barcode identifiers, such that the ballot can be processed based on the result of the signature verification. After the pouch containing the ballot of a verified signature is properly sorted (to be tallied) and if no remedial procedure is needed, then any stored relationship between the pouch and stub barcode identifiers may be erased, thereby preserving anonymity of the ballot.

According to another aspect of the invention, a vote-by-mail envelope includes a pouch for receiving a ballot. The envelope further includes a stub that is offset from the pouch and includes a signature space for a voter's signature. The stub may be offset laterally or downwardly from the pouch. In addition, the envelope includes a flap for closing the pouch and covering the voter's signature. The flap includes a pouch-side region for overlying the pouch and a stub-side region for overlying the stub. The envelope also includes a first barcode printed on the flap and located on the pouch-side region of the flap, and a second barcode printed on the flap and located on the stub-side region of the flap.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Figure 1:
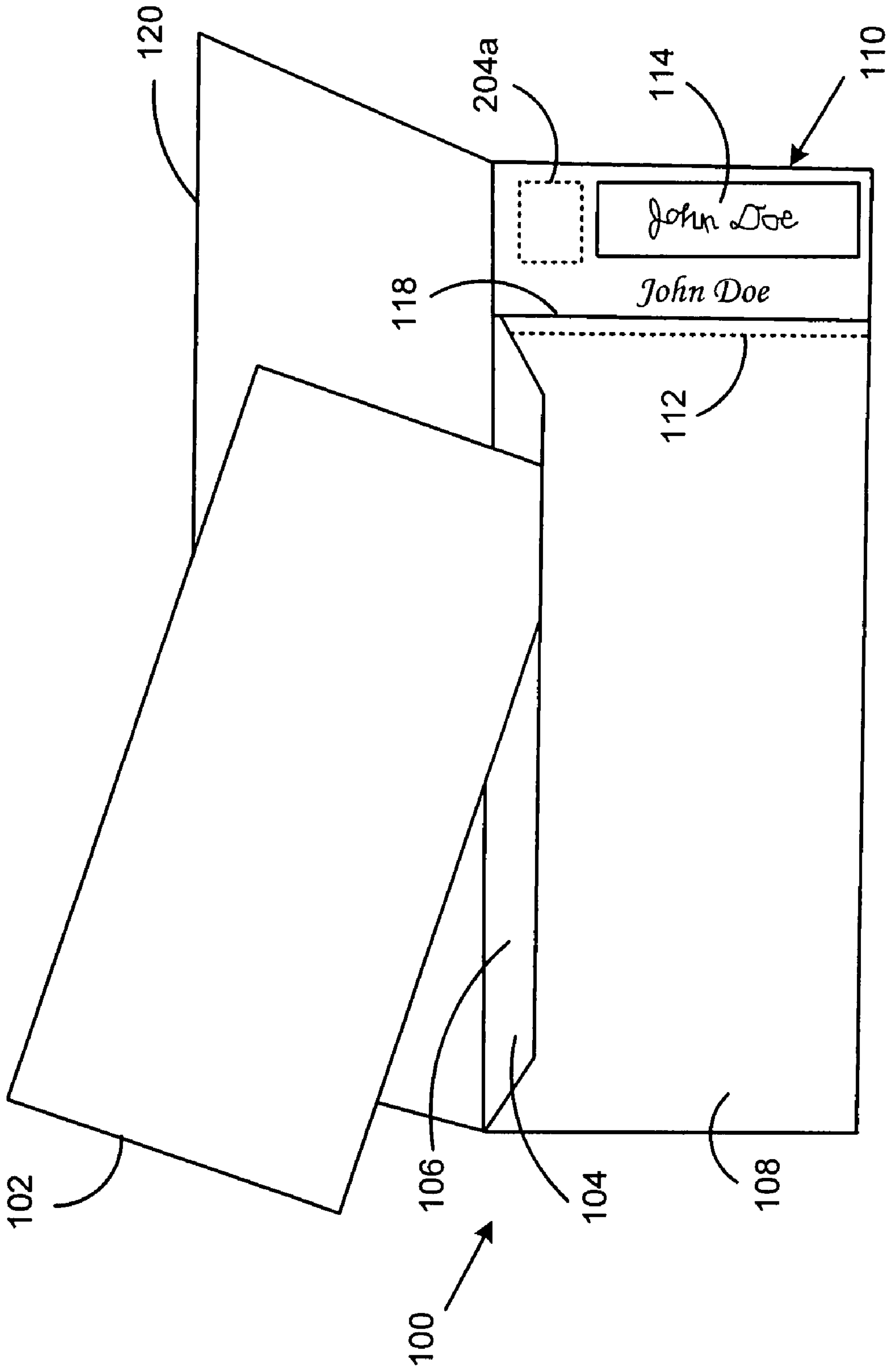
FIG. 1 schematically shows a rear view of a vote-by-mail return envelope provided according to an aspect of the present invention, with a ballot being inserted into a pouch that is part of the return envelope.

FIG. 1 schematically shows a rear view of a vote-by-mail return envelope 100 provided according to an aspect of the present invention, with a ballot 102 being inserted into a pouch 104 that is part of the return envelope 100. As is often the case with an envelope pouch, the pouch 104 of the envelope 100 is formed from a front sheet 106 (of which, in some embodiments, only a small part of its rear side is visible) of the envelope 100 and a rear sheet 108 of the envelope 100. However, the envelope 100 differs from a conventional envelope in part by having an extension portion or stub 110 that extends laterally beyond an end side boundary (indicated approximately by dashed line 112) of the pouch 104. As will be discussed further below, the rear surface of the extension portion 110 carries a signature space 114 to be signed by the voter. The end side boundary 112 of the pouch 104 is defined by an adhesion region (indicated approximately at 118) at which the front sheet 106 is adhered to the rear sheet 108. As seen from FIG. 1, the adhesion region 118 separates the signature space 114 from the pouch 104.

The extension portion 110 of the envelope 100 may be formed in a number of ways. For example, the front sheet 106 alone may extend laterally past the adhesion region 118, or the rear sheet 108 alone may extend laterally past the adhesion region 118, or both of the front and rear sheets may extend laterally past the adhesion region. In the first of these three possibilities, the signature space 114 may be carried on the rear surface of the front sheet 106. In the latter two of these three possibilities, the signature space may be carried on the rear surface of the rear sheet 108. (It may also be the case, even if both sheets extend laterally past the adhesion region 118, that one of the sheets extends further than the other.) If both sheets extend past the adhesion region 118, there may be another adhesion region, which is not separately indicated, to join the sheets together, for example, at the outer edge of the extension portion/stub 110.

The envelope 100 further includes a flap 120 which is sized so as to substantially completely cover the rear surface of the envelope 100 (including the rear surface of the extension portion/stub 110). The flap 120 is located so as to close the pouch 104 of the envelope 100 when the flap/envelope are sealed.

In some embodiments, the envelope 100 may be generally similar in construction to one or more of the vote-by-mail return envelopes disclosed in prior, co-pending U.S. patent application Ser. No. 11/646,146, filed Dec. 27, 2006, which is incorporated herein by reference. One possible difference between the envelope 100 disclosed herein and the envelopes disclosed in the prior application, is that the envelope 100 shown herein may, at least when the flap 120 is closed, be sufficiently opaque at the stub 110 to prevent the voter's signature from being viewed, even by shining a bright light through the stub 110.

In using the return envelope 100 to vote by mail, the voter may simply mark his/her ballot 102, place it in the pouch 104 of the envelope 100, inscribe his/her signature in the signature space 114 and seal the envelope 100 by adhering the flap 120 to the rear surface of the envelope 100.

Figure 2:
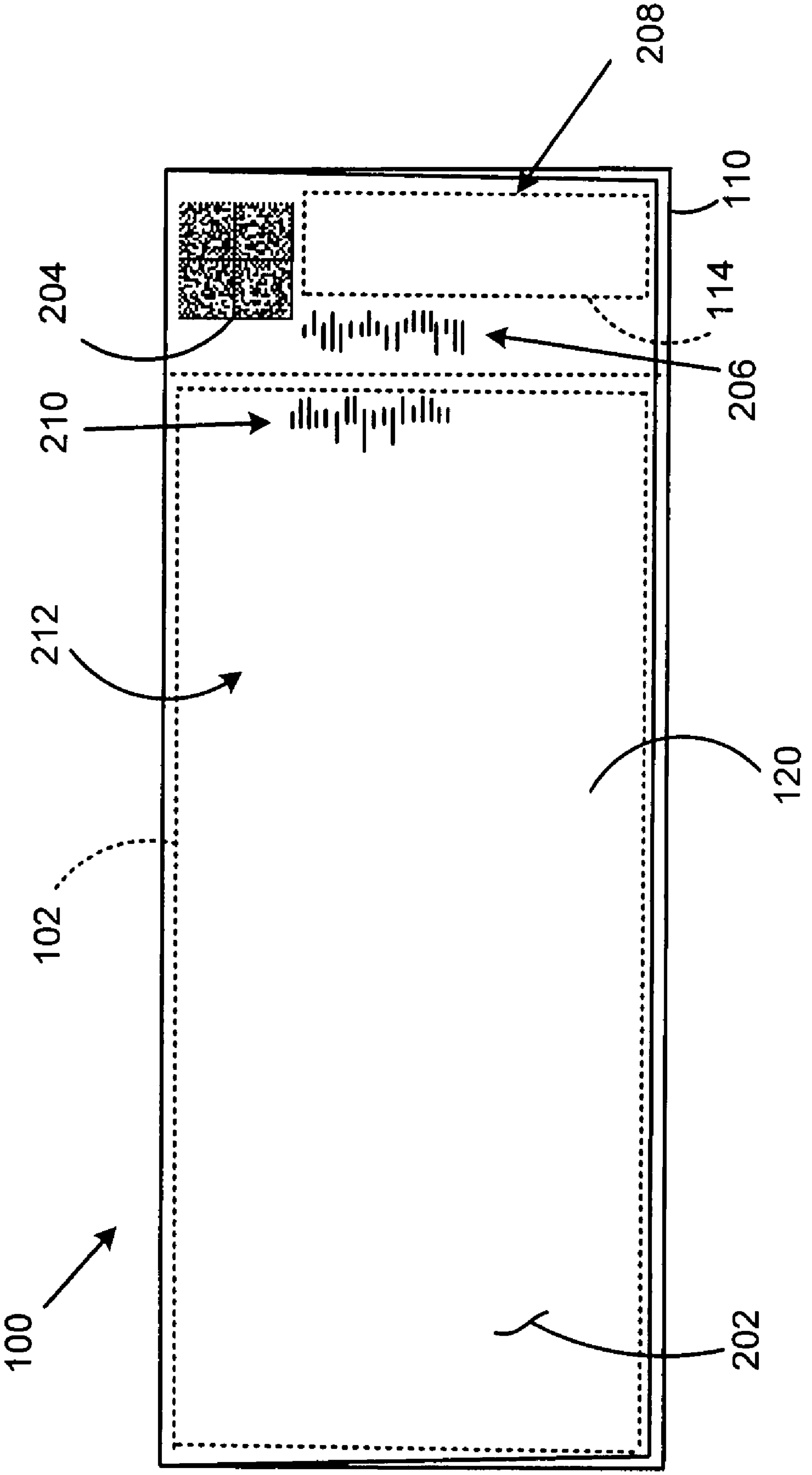
FIG. 2 is a schematic rear view of the vote-by-mail return envelope of FIG. 1, showing the condition of the envelope when it is sealed for mailing, and also showing in phantom certain internal features of the sealed envelope.

FIG. 2 is a schematic rear view of the return envelope 100, showing the condition of the envelope when it is sealed for mailing. As seen from FIG. 2, the flap 120 is adhered to the rear surface of the envelope 100 to cover substantially all of the rear surface, including the signature space 114 (shown in phantom). Also shown in phantom is the ballot 102 which is contained in the pouch (not separately indicated) of the envelope 100.

Three other features of the envelope 100 are visible in FIG. 2, all printed on the outer surface 202 of the flap 120 (it will be recognized that when the flap 120 is sealed as shown in FIG. 2, the outer surface 202 of the flap 120 forms substantially all of the rear surface of the envelope 100). A first one of the three features referred to in the previous sentence is a barcode 204 (in the particular example shown, a two-dimensional barcode), which contains data to identify the voter whose ballot is contained in the envelope and who signed the stub 110. A second one of the three features is a barcode 206. The barcode 206 represents a unique identifier (numeric, alphanumeric or a string of letters or other characters) for the stub 110. The barcode 206 is located on a region 208 of the flap 120 that overlies the stub 110. The region 208 may be referred to as the stub-side region of the flap 120. The third one of the three features is a barcode 210. The barcode 210 represents a unique identifier (numeric, alphanumeric or a string of letters or other characters) for the pouch 104 (FIG. 1). The barcode 210 is located on a region 212 of the flap 120 that overlies the pouch 104. The region 212 may be referred to as the pouch-side region of the flap 120. It should be noted that the barcodes 206, 210 can be applied to the envelope 100 before the envelope 100 is sent to the voter, or can be printed on the regions 208, 212, respectively, after receipt of the envelope 100 back from the voter as described below.

In some embodiments, for example, the barcodes (as illustrated) may be implemented as four-state barcodes such as the four-state barcode specified for some postal applications by the U.S. Postal Service. The barcodes 206, 210 may or may not be identical. In preferred embodiments of the invention, the identifier represented by stub barcode 206 has a different value from the identifier represented by pouch barcode 210, i.e., the barcodes 206 and 210 are not the same, but instead are associated with one another as described elsewhere herein. In this manner, the matching of the barcode 206 to the barcode 210, and thus the ballot contained in the pouch 104 to a specific voter, by simple visual inspection is prevented. The number of data bits supported by the barcodes 206, 210 may be more or fewer than the number of bits indicated in the drawings.

In accordance with conventional practices a destination address for the return envelope (address of the voting registrar) may be printed on the front surface (not shown) of the vote-by-mail envelope. It will be appreciated that the front surface of the envelope is the opposite surface from the rear surface that is shown in FIG. 2. Of course, virtually all of the rear surface of the envelope is formed by the outer surface of the flap 120.

As an alternative to printing the two-dimensional barcode 204 on the flap 120, as shown in FIG. 2, the two-dimensional barcode may be printed adjacent the signature space 114, as indicated in phantom at 204*a* in FIG. 1.

Figure 3:
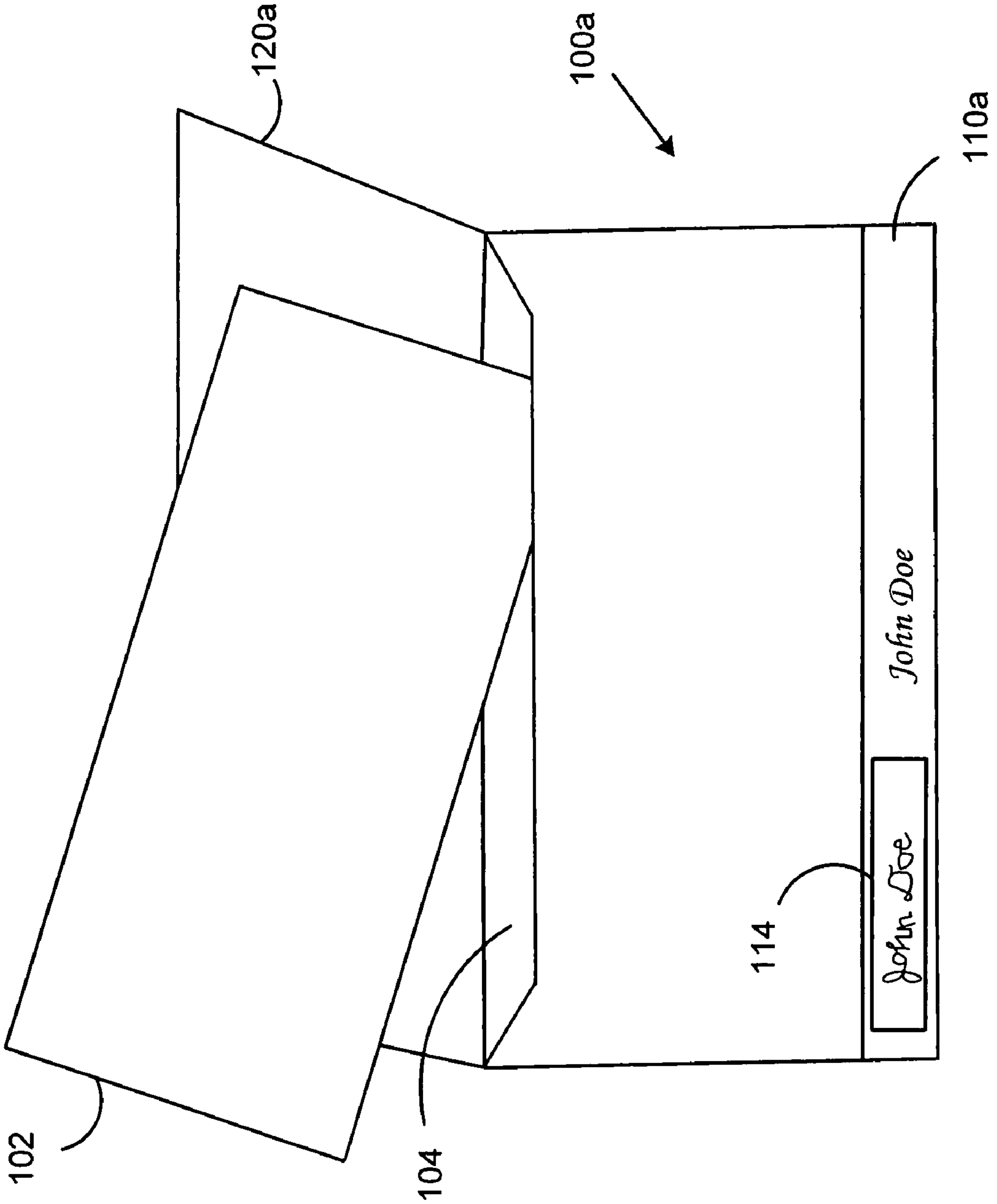
FIG. 3 is a view similar to FIG. 1 of another embodiment of a vote-by-mail return envelope.

FIG. 3 is a view similar to FIG. 1 of another embodiment of a vote-by-mail return envelope. The vote-by-mail return envelope shown in FIG. 3, generally indicated by reference numeral 100*a,* differs from the vote-by-mail return envelope shown in FIGS. 1 and 2 principally in that the extension portion/stub 110*a* of the envelope 100*a* is offset downwardly relative to the pouch 104, rather than laterally, as is the case with the stub 100 relative to the pouch 104 in the envelope 100 of FIGS. 1 and 2. It should also be understood that the flap 120*a* of the envelope 100*a* of FIG. 3 may have printed thereon the same barcodes (not visible in FIG. 3) 204, 206, 210 described above, with barcodes 204, 206 located on a portion of the flap 120*a* that overlies stub 110*a* when the flap is sealed, and with barcode 210 located on a portion of the flap 120*a* that overlies the pouch 104 when the flap is sealed. The portion of the flap 120*a* that overlies stub 110*a* may again be referred to as the stub-side region of the flap 120*a,* and the portion of the flap 120*a* that overlies the pouch 104 may again be referred to as the pouch-side region of the flap 120*a*.

Figure 4:
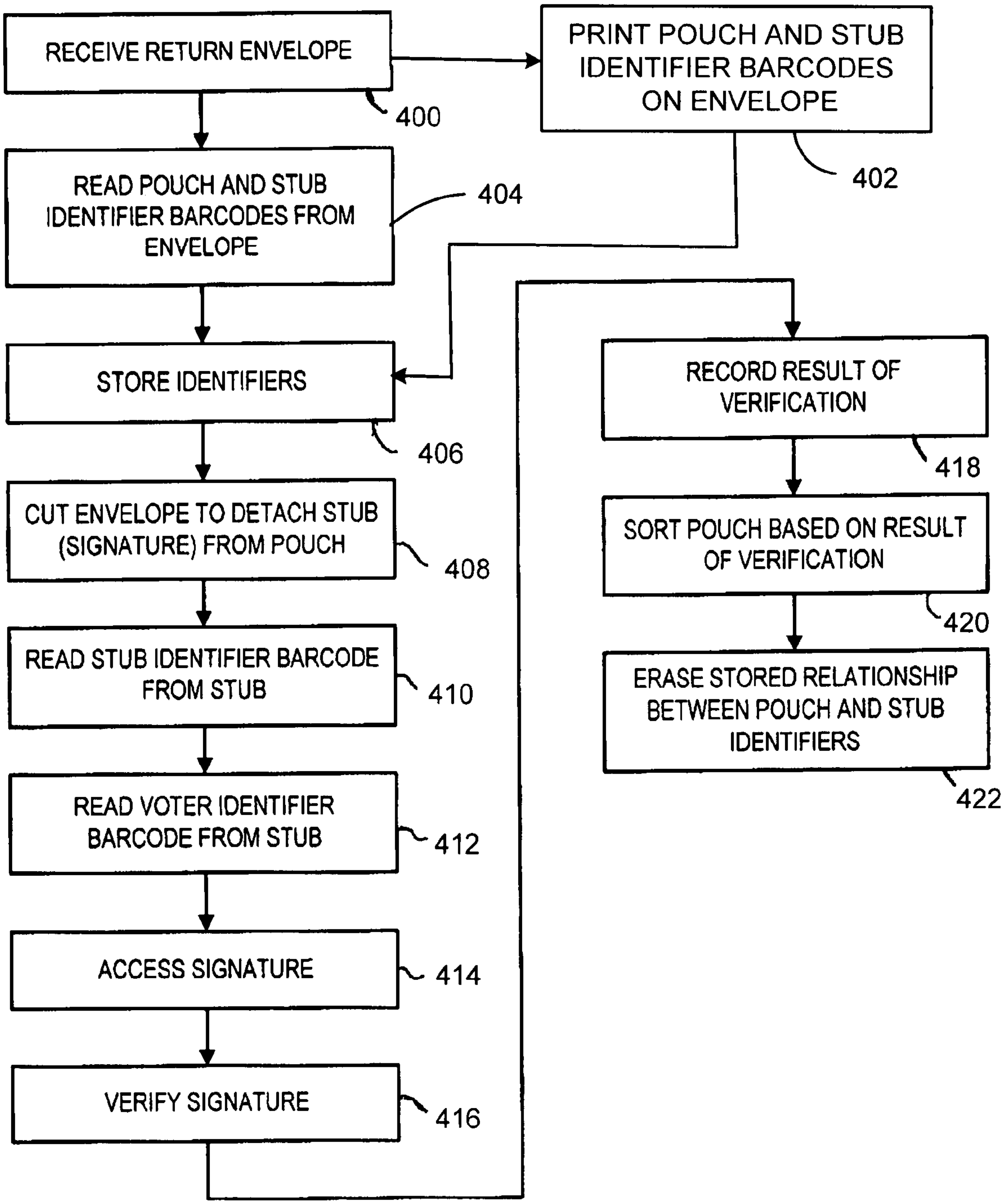
FIG. 4 is a flow chart that illustrates a process provided according to an aspect of the invention for processing a vote-by-mail return envelope after the envelope is received by the voting registrar from the voter.

FIG. 4 is a flow chart that illustrates a process provided according to an aspect of the invention for processing a vote-by-mail return envelope 100 or 100*a* after the envelope is received by the voting registrar from the voter. (The terms “voting registrar” or “registrar” as used herein should be understood to refer to any organization that processes, verifies and/or counts ballots mailed in by voters.)

At 400 in FIG. 4, a return envelope 100 (or 100*a*), presumably with a ballot 102 inside, is received at the registrar’s office. If barcodes are not preprinted on the return envelope 100, then in step 402 such barcodes are generated and a stub barcode 206 and pouch barcode 210 are printed on the envelope 100 in the respective areas. It should be understood, of course, that if the barcodes 26, 210 are already provided, then the processing of step 402 need not occur. If the barcodes 206, 210 are already provided on the envelope 100, then in step 404 the stub barcode 206 and the pouch barcode 210 are scanned to obtain the identifiers represented by the two barcodes 206, 210. Regardless of whether the barcodes 206, 210 are scanned or generated and printed, in step 406 the identifiers represented by the barcodes 206, 210 are then preferably stored. For example, the two identifiers may be stored in respective fields of a particular entry in a database, so that the entry in question provides a link, association or relationship between the two identifiers. In other words, one of the identifiers may be looked up in the database by reference to the other identifier. In other embodiments, a suitable key or other data may provide the link or association between the two identifiers. For example, such a key might be represented by an exponent e in a Galois field $GF_n$. The barcode 206 could represent elements $m_i$ of $GF_n$ and the barcode 210 could represent elements $n_i=m_i^e$. Since there might be many voters, several exponents may be used, and the voters partitioned in groups $G_1, G_2, \ldots G_N$, with each group having its own key $e_j$.

Figure 5:
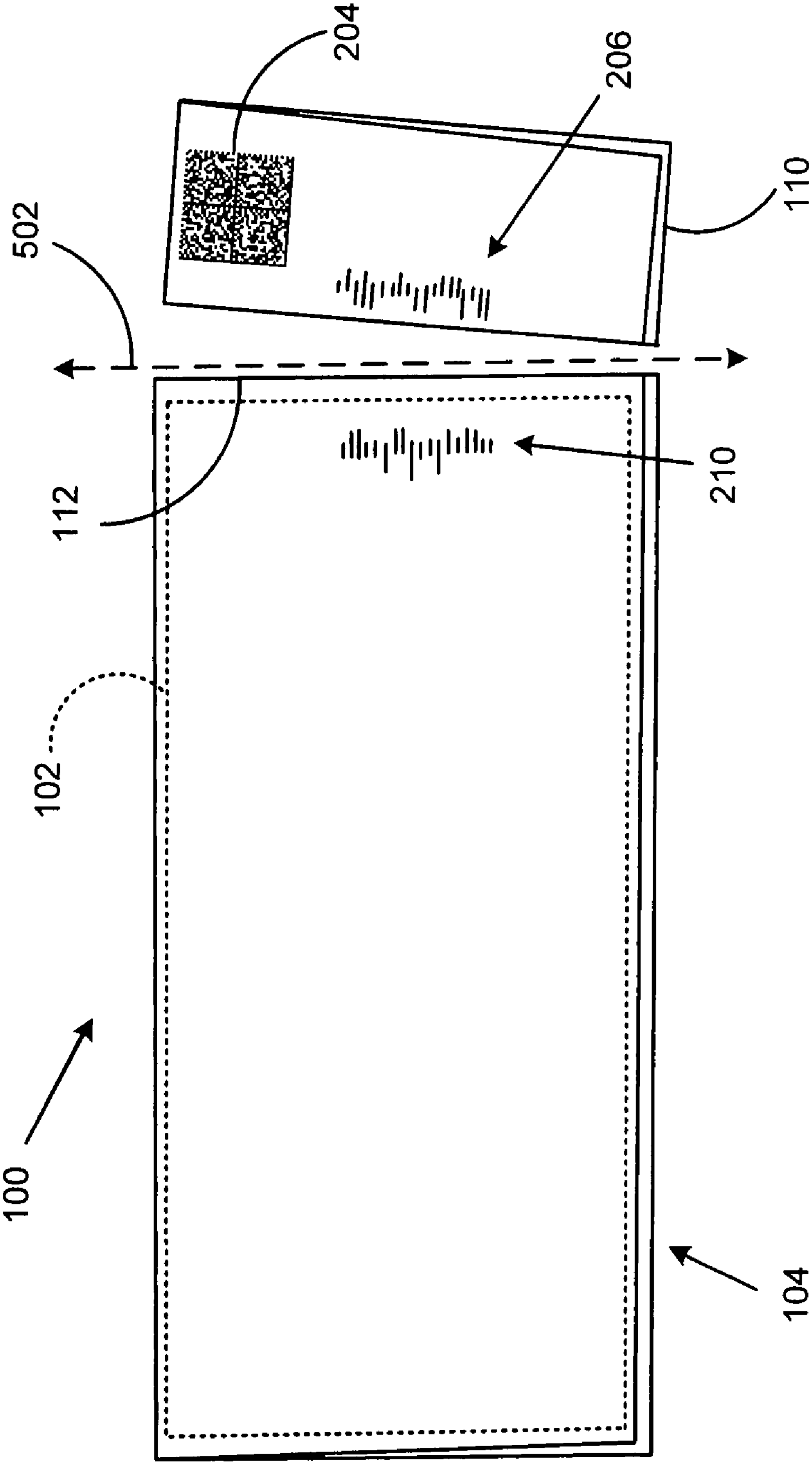
FIG. 5 is a view similar to FIG. 2, schematically illustrating a technique for detaching identifying information from the ballot contained within the return envelope.

In 408, the voter’s signature and identifying information are separated from the pouch and ballot, such as, for example, by cutting. FIG. 5 is a view similar to FIG. 2, and schematically illustrates a technique for cutting the envelope in this manner. In particular, the stub 110 may be detached from the pouch 104 and the ballot 102, by cutting the envelope vertically (as indicated schematically at 502) just outside the boundary 112 of the pouch 104. It will also be noted that the cutting takes place between the barcodes 206, 210. It should further be understood that the above-mentioned stub-side region of the flap 120, at least after the operation 408 (as illustrated in FIG. 5), should be considered part of the stub 110, and the pouch-side region of the flap 120, at least after the operation 408 (as illustrated in FIG. 5), should be considered part of the pouch 104. After the cutting operation, the barcode 210 remains on the pouch 104 to identify the pouch during further processing, the barcode 206 remains on the stub 110 to identify stub 110 during further processing, and data stored in a database provides a link between the stub identifier and the pouch identifier to allow processing of the stub to affect processing of the pouch.

Once the pouch and stub have been separated in 408, the pouch and stub may be processed separately. For example, the stub may be collected with a batch of stubs from other vote-by-mail return envelopes sent by other voters, and the pouch may be collected with a batch of pouches from the other envelopes. At 410 in FIG. 4, the stub identifier barcode 206 is read from the stub 110. At 412 in FIG. 4, the two-dimensional barcode 204 is read from the stub 110 to identify the voter whose signature is carried by the stub 110 and whose ballot is contained in the pouch that was separated from the stub.

Figure 6:
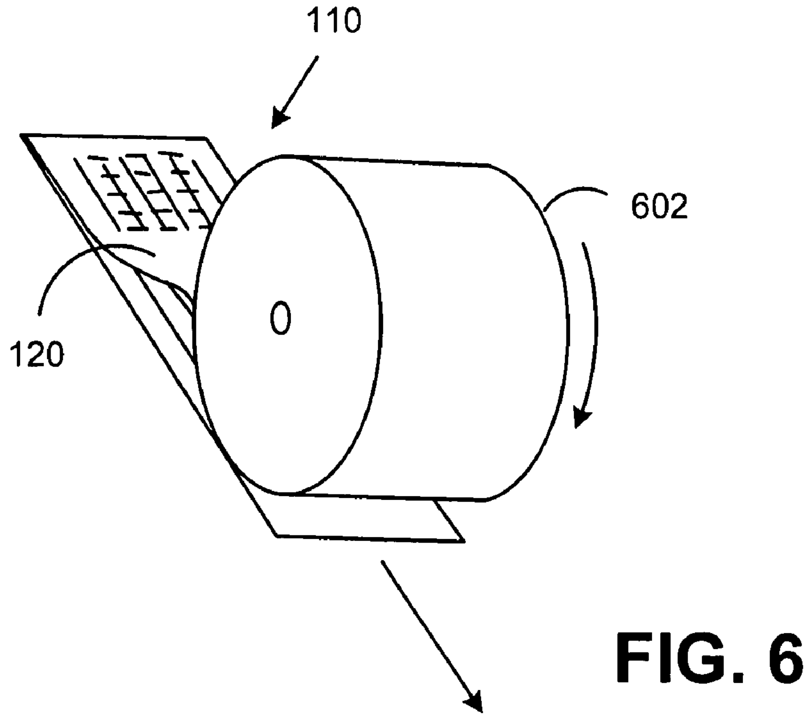
FIGS. 6 and 7 are schematic isometric views that illustrate a technique for uncovering a voter's signature contained within an envelope stub shown in FIG. 5.
Figure 7:
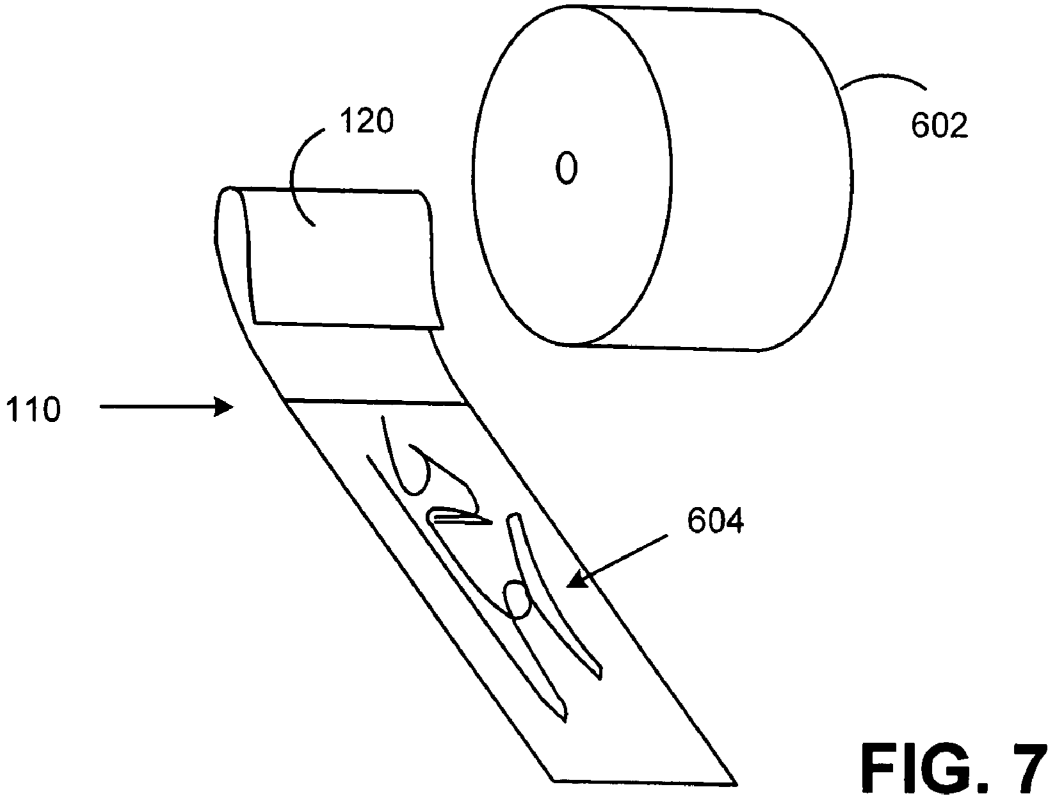

At 414, the stub 110 is physically processed to allow the voter’s signature to become visible, and possibly to allow an image of the voter’s signature to be captured. Prior to the physical processing of the stub at 414, at two sides (bottom and right sides) of the stub the flap may be held to the stub by adhesive (not shown), the hinge of the flap may form a top side of the stub, and the flap may be unattached at the left side of the stub (where the stub was cut from the pouch). To allow the flap 120 to be peeled back, the bottom and right sides of the stub 110 may be cut off. Then the stub may be fed past a friction wheel 602, as schematically indicated in FIGS. 6 and 7 (pinch roller below the stub is not shown), to peel back the flap so as to reveal the voter’s signature 604. (In the view of FIG. 7, the friction wheel is shown in an offset position relative to its actual position, which is as shown in FIG. 6. The offset presentation of the friction wheel in FIG. 7 is for the purpose of allowing into view the peeled back condition of the flap and the voter’s signature uncovered by action of the friction wheel.)

Figure 8:
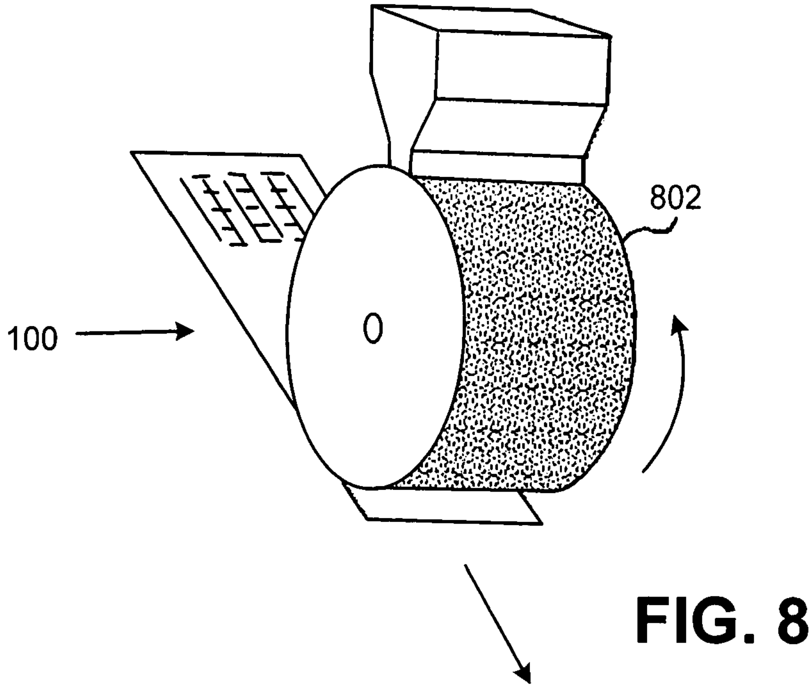
FIGS. 8 and 9 are schematic isometric views that illustrate a technique for making visible a voter's signature contained within an envelope stub shown in FIG. 5.
Figure 9:
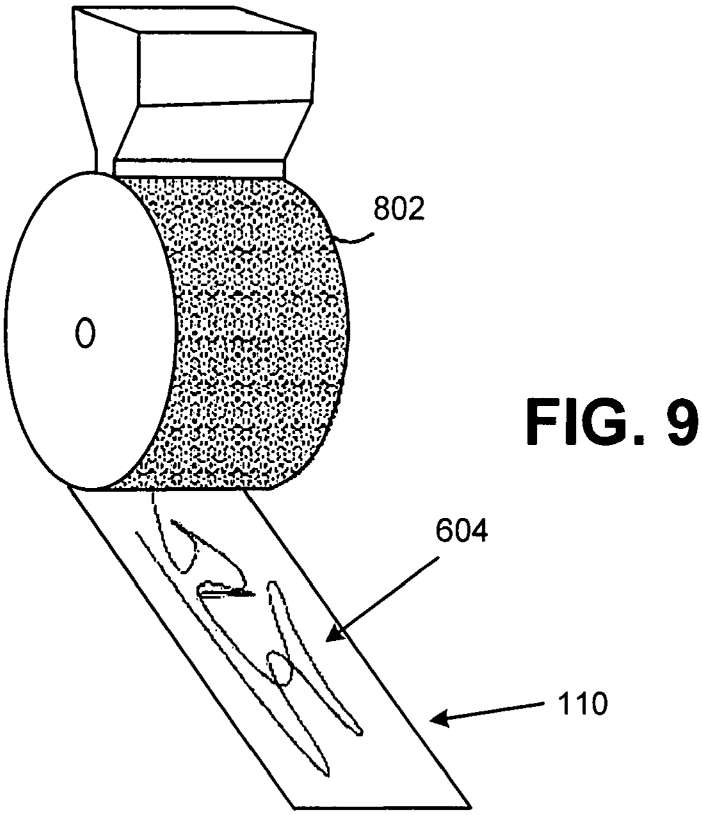

In an alternative embodiment of step 414 (enabled by an alternative embodiment of the stub), cutting and peeling of the stub 110 are not performed. Instead, the flap may be formed of a type of paper or other material that becomes transparent when a suitable substance or solution (e.g., water) is applied to the flap. Materials that may be changed from opaque to transparent by application of a suitable chemical, and chemicals for so doing, are disclosed and/or discussed in U.S. Pat. Nos. 6,103,355; 6,143,120; and 6,692,819; and in co-pending, commonly assigned patent application Ser. No. 11/636,800, filed Dec. 11, 2006. The three patents and the patent application set forth in the previous sentence are all incorporated herein by reference. In the illustration of the alternative embodiment of step 414, as seen from FIGS. 8 and 9, the stub 110 is fed past an applicator wheel 802 (pinch roller again not shown) which applies the transparentizing chemical to the stub/flap to allow the signature 604 to become visible through the flap. In some embodiments the flap may have at least two layers (layers not separately shown), including an outer, transparentizable opaque layer, and an inner, protective, transparent layer to keep the transparentizing chemical from the signature. The region of the flap that is transparentizable and/or with the two layers may be confined to the locus of the signature space.

Referring again to FIG. 4, at 416, the voter's signature is verified. This may entail, for example, retrieving a reference signature image from a database using the voter identification information read at 412 from the two-dimensional barcode. The signature verification may include comparing the retrieved reference signature with an image captured of the signature carried on the stub, or directly with the signature on the stub. The comparison of the signature on the stub with the reference signature may be performed by a human employee of the voting registrar or automatically by machine analysis of the reference signature and the signature on the stub.

At 418, the result of the signature verification operation is recorded. For example, the result (e.g., signature verified, signature absent, signature does not match or symbols representing these results) may be stored in a database in association with either or both of the stub identifier for the stub read at 416 and the pouch identifier for the pouch that was separated at 408 from the stub read at 416. Various arrangements of data may be used, such that the result of the signature verification operation may be accessed directly or indirectly by reference to the pouch identifier.

At 420, the pouch that was separated from the stub read at 416 can be identified (using the associated identifiers) and sorted, perhaps as part of an operation in which a batch of pouches is sorted. The sorting may be based on the stub identifier, the pouch identifier and the result of the signature verification operation. The sorting should be understood to be based on the stub identifier, for example, if (a) the pouch identifier is read during the sorting, and is used to access the stub identifier, which in turn is used to access the result of the signature verification operation; or (b) the stub identifier is used to store the result of the signature operation in association with the pouch identifier, and the pouch identifier is read during the sorting and then used to access the result of the signature verification operation. For example, if the result of the signature verification operation indicates that the signature on the stub is valid, the sorting of the pouch may cause the pouch to be sorted into a pile of pouches that are to be opened for tabulation of the ballots inside. If the signature was found to be missing or invalid, the pouch may be sorted into one or more other piles, for remedial action. The remedial action may be in accordance with conventional practices.

At 422, at least in the case of pouches to be opened for tabulation of ballots, the data, e.g., the key(s), database entry or the like, that associates the pouch identifier with the stub identifier may be erased or deleted, to preserve the anonymity of the ballot. This step may be performed prior to the opening of the pouch.

In some embodiments, in the case of pouches for which the voter's signature was invalid or missing, the stored data link between the stub and pouch identifiers may remain stored, and the pouch may be brought back together with the stub that was detached from it, to aid in investigation of possible voting fraud or other remedial action.

With the process illustrated in FIG. 4, the risk of damage to the pouch and ballot is reduced, since the signature and stub are separated from the pouch before the flap is peeled back from the stub or transparentized.

As would be expected by those of ordinary skill, the data capture, data storage and data manipulation functionality described above may be implemented by suitable software programming of conventional computer equipment. As is well known, such computer equipment may include one or more microprocessors, program memory coupled to the processor(s) for storing the software instructions so that the instructions may be fetched and executed by the processor(s), mass storage, input/output devices, and other conventional features of computer equipment. Performance of the above described processes may also require operation of paper-handling and barcode scanning/image capture equipment, all of which may be of generally conventional construction. The paper-handling equipment may be controlled by the computer equipment, which may receive data inputs from the scanning equipment.

The method steps described herein need not be performed in the order set forth above. Rather, the steps may be performed in any order that is practicable. For example, the order of steps 410 and 412 may be interchanged, and the reference signature may be retrieved before peeling back or transparentizing the flap to allow the signature on the stub to be seen.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A method of processing a vote-by-mail return envelope having a first portion including a pouch that contains a ballot for a voter and a second portion on which a signature of the voter is provided, the envelope further having a first barcode located on the first portion and a second barcode located on the second portion, the method comprising:

scanning the envelope to read the first and second barcodes from the envelope;

detaching the first portion of the envelope from the second portion of the envelope such that the pouch containing the ballot is separate from the voter's signature;

verifying the voter's signature provided on the second portion of the envelope;

identifying the first portion of the envelope based on an association of the first barcode with the second barcode; and processing the ballot contained in the pouch of the first portion based on whether the voter's signature was verified or not.

2. The method of claim 1, further comprising:

storing the first barcode in association with the second barcode in a database.

3. The method of claim 2, further comprising:

deleting the stored first barcode and second barcode from the database.

4. The method of claim 1, further comprising:

storing a result of verifying the voter's signature in association with at least one of the first and second barcodes.

5. The method according to claim 1, wherein the first and second barcodes are identical.

6. A method of processing a vote-by-mail return envelope having a first portion including a pouch that contains a ballot for a voter and a second portion on which a signature of the voter is provided, the method comprising:

printing a first barcode on the first portion of the envelope and a second barcode on the second portion of the envelope, the first barcode being linked to the second barcode;

detaching the first portion of the envelope from the second portion of the envelope such that the pouch containing the ballot is separate from the voter's signature;

verifying the voter's signature provided on the second portion of the envelope;

identifying the first portion of the envelope based on the link of the first barcode with the second barcode; and processing the ballot contained in the pouch of the first portion based on whether the voter's signature was verified or not.

7. The method according to claim 6, further comprising: deleting the link between the first barcode and the second barcode.

8. The method according to claim 6, wherein the link between the first barcode and second barcode is formed using a key.

* * * * *